US011624436B2

(12) United States Patent
Laroche et al.

(10) Patent No.: US 11,624,436 B2
(45) Date of Patent: Apr. 11, 2023

(54) VEHICLE HAVING AN AIR-COOLED CONTINUOUSLY VARIABLE TRANSMISSION

(71) Applicant: BOMBARDIER RECREATIONAL PRODUCTS INC., Valcourt (CA)

(72) Inventors: David Laroche, Sherbrooke (CA); Steve Brouillette, Sherbrooke (CA); Catherine Geoffroy, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/583,759

(22) Filed: Jan. 25, 2022

(65) Prior Publication Data

US 2022/0235860 A1  Jul. 28, 2022

Related U.S. Application Data

(60) Provisional application No. 63/142,645, filed on Jan. 28, 2021.

(51) Int. Cl.
*F16H 57/04* (2010.01)
*F16H 57/02* (2012.01)
(Continued)

(52) U.S. Cl.
CPC ....... *F16H 57/0416* (2013.01); *F16H 57/031* (2013.01); *F16H 57/035* (2013.01);
(Continued)

(58) Field of Classification Search
CPC .... F16H 57/027; F16H 57/031; F16H 57/035; F16H 57/0415; F16H 57/0416;
(Continued)

(56) References Cited

U.S. PATENT DOCUMENTS 6,338,688 B1 * 1/2002 Minami ................ F16H 57/035
474/146
7,281,596 B2 * 10/2007 Fukuda ............... F16H 57/0415
474/144
(Continued)

FOREIGN PATENT DOCUMENTS

CN       103573994 A  *  2/2014  ........... F16H 57/035
ES        2331167 A1  * 12/2009  ............. B60K 11/06
(Continued)

*Primary Examiner* — Adam D Rogers
(74) *Attorney, Agent, or Firm* — BCF LLP

(57) ABSTRACT

A vehicle has an engine; a drive pulley connected to and driven by a crankshaft of the engine; a driven pulley; an output shaft connected to and driven by the driven pulley; a belt looped around the pulleys; and a cover connected to the engine. The cover and the engine define a volume therebetween. A baffle disposed in the volume separates the volume in first and second chambers. The first chamber is disposed between the baffle and the engine. The second chamber is disposed between the baffle and the cover. The pulleys are disposed in the second chamber. The baffle defines first and second apertures fluidly communicating the first chamber with the second chamber. An air inlet is fluidly connected to the first chamber. An air outlet is fluidly connected to the second chamber.

23 Claims, 10 Drawing Sheets

(51) Int. Cl.
*F16H 57/031* (2012.01)
*F16H 57/035* (2012.01)
*F16H 57/027* (2012.01)

(52) U.S. Cl.
CPC ....... *F16H 57/0489* (2013.01); *F16H 57/027* (2013.01); *F16H 2057/0203* (2013.01); *F16H 2057/02065* (2013.01)

(58) Field of Classification Search
CPC ......... F16H 57/0489; F16H 2057/0203; F16H 2057/02065
See application file for complete search history.

(56) References Cited

U.S. PATENT DOCUMENTS

| | | | | |
|---|---|---|---|---|
| 7,363,999 | B2 * | 4/2008 | Hastings | F16H 57/0489 |
| | | | | 180/908 |
| 7,487,853 | B2 * | 2/2009 | Ishida | F16H 57/0489 |
| | | | | 180/230 |
| 7,647,995 | B2 * | 1/2010 | Ishida | F16H 57/0415 |
| | | | | 180/68.1 |
| 7,892,121 | B2 * | 2/2011 | Oishi | F16H 57/0415 |
| | | | | 474/46 |
| 9,140,340 | B2 * | 9/2015 | Lai | F16H 57/0416 |
| 9,453,573 | B2 * | 9/2016 | Renner | F16H 57/0416 |
| 9,528,595 | B2 * | 12/2016 | Itoo | F16H 57/027 |
| 9,863,523 | B2 * | 1/2018 | Stocks | F16H 9/14 |
| 10,697,532 | B2 | 6/2020 | Schleif et al. | |
| 2021/0231211 | A1 * | 7/2021 | Itoo | F16H 57/0489 |

FOREIGN PATENT DOCUMENTS

| | | | |
|---|---|---|---|
| JP | H1111171 A | * | 1/1999 |
| RU | 2716396 C1 | * | 3/2020 |

\* cited by examiner

VEHICLE HAVING AN AIR-COOLED CONTINUOUSLY VARIABLE TRANSMISSION

CROSS-REFERENCE

The present application claims priority to U.S. Provisional Patent Application No. 63/142,645, filed Jan. 28, 2021, the entirety of which is incorporated by reference.

FIELD OF TECHNOLOGY

The present technology relates to vehicles having air-cooled continuously variable transmissions.

BACKGROUND

Some vehicles, including for example all-terrain vehicles (ATVs) and similar vehicles, have a powertrain which includes a continuously variable transmission (CVT). The CVT has a drive pulley, a driven pulley and a belt. The drive pulley is driven by the engine of the vehicle. The belt is looped around the drive and driven pulleys to transfer torque between the pulleys. The driven pulley drives the other components of the powertrain. In the case of some ATVs, the components of the powertrain that are driven by the driven pulley include a geared transmission and various shafts that connect the geared transmission to the wheels.

As the vehicle accelerates and decelerates, the effective diameters of the pulleys change which causes stress on the belt, in addition to the stress caused to the belt by the transfer of torque between the pulleys. The pulleys themselves are also subject to stress. This results in a lot of heat being generated. This heat can, in some cases, lead to premature wear of components of the CVT. This is especially true in CVTs where the belt is made of a material, such as rubber, that is more sensitive to heat than a belt made of metal.

Thus, there is a desire for a vehicle having a CVT that can be cooled during operation.

SUMMARY

It is an object of the present technology to ameliorate at least some of the inconveniences present in the prior art.

According to an aspect of the present technology, there is provided a vehicle having an engine. The engine has a crankcase; and a crankshaft rotationally supported by the crankcase. The vehicle also has a drive pulley connected to and driven by the crankshaft; a driven pulley; an output shaft connected to and driven by the driven pulley; a belt looped around the drive pulley and the driven pulley for transferring torque between the drive pulley and the driven pulley; and a cover connected to the engine. The cover and the engine define a volume therebetween. The drive pulley and the driven pulley are disposed in the volume. A baffle is disposed in the volume. The baffle separates the volume in a first chamber and a second chamber. The first chamber is disposed between the baffle and the engine. The second chamber is disposed between the baffle and the cover. The drive pulley and the driven pulley are disposed in the second chamber. The baffle defines first and second apertures fluidly communicating the first chamber with the second chamber. An air inlet is fluidly connected to the first chamber. An air outlet is fluidly connected to the second chamber. During operation of the engine, the air inlet supplies air to the first chamber, air in the first chamber flows into the second chamber via the first and second apertures, and air in the second chamber flows out of the second chamber via the air outlet.

In some embodiments, the air outlet is defined by the cover.

In some embodiments, the air inlet is defined by the engine.

In some embodiments, the air inlet and the air outlet are disposed on a same side of a vertical plane containing an axis of rotation of the drive pulley.

In some embodiments, the air inlet and the air outlet are disposed on a first side of the vertical plane and the output shaft is disposed on a second side of the vertical plane.

In some embodiments, an air intake duct is connected to the air inlet and an air exhaust duct is connected to the air outlet.

In some embodiments, the first aperture is at least partially aligned with the drive pulley and the second aperture is at least partially aligned with the driven pulley.

In some embodiments, the drive pulley has a drive pulley radius; at least a portion of the first aperture is at a first distance from an axis of rotation of the drive pulley that is less than the drive pulley radius; the driven pulley has a driven pulley radius; and at least a portion of the second aperture is at a second distance from an axis of rotation of the driven pulley that is less than the driven pulley radius.

In some embodiments, the first aperture is at least partially vertically lower than the axis of rotation of the drive pulley.

In some embodiments, the first aperture extends horizontally at least partially on both sides of the axis of rotation of the drive pulley.

In some embodiments, the first aperture generally has a shape of an annular segment.

In some embodiments, the crankshaft extends through the baffle via a third aperture defined in the baffle; and the first and third apertures fuse together.

In some embodiments, the second aperture is at least partially vertically higher than the axis of rotation of the driven pulley.

In some embodiments, the second aperture is at least partially between the axes of rotation of the drive and driven pulleys.

In some embodiments, the second aperture generally has a shape of an annular segment.

In some embodiments, the output shaft extends through the baffle via a fourth aperture defined in the baffle; and the second and fourth apertures are completely separate from each other.

In some embodiments, the engine defines at least a portion of a lip; and the cover is connected to the lip.

In some embodiments, at least part of the lip protrudes from the crankcase.

In some embodiments, an edge of the cover defines a closed contour; an edge of the lip defines a closed contour; and a joint defined between the edges of the cover and the lip is sealed.

In some embodiments, the baffle has at least one wall extending toward the engine. The at least one wall defines a passage for directing air from the air inlet to the second aperture.

In some embodiments, the passage passes under the first aperture.

In some embodiments, the baffle defines a curved recess. The curved recess has an edge adjacent to a portion of the inlet. The edge of the curved recess has a shape corresponding to a shape of the portion of the inlet.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle (ATV) 10. However, it is contemplated that aspects of the present technology could be used in other types of vehicles having a continuously variable transmission (CVT), such as side-by-side vehicles, three-wheeled on-road vehicles and snowmobiles.

Figure 1:
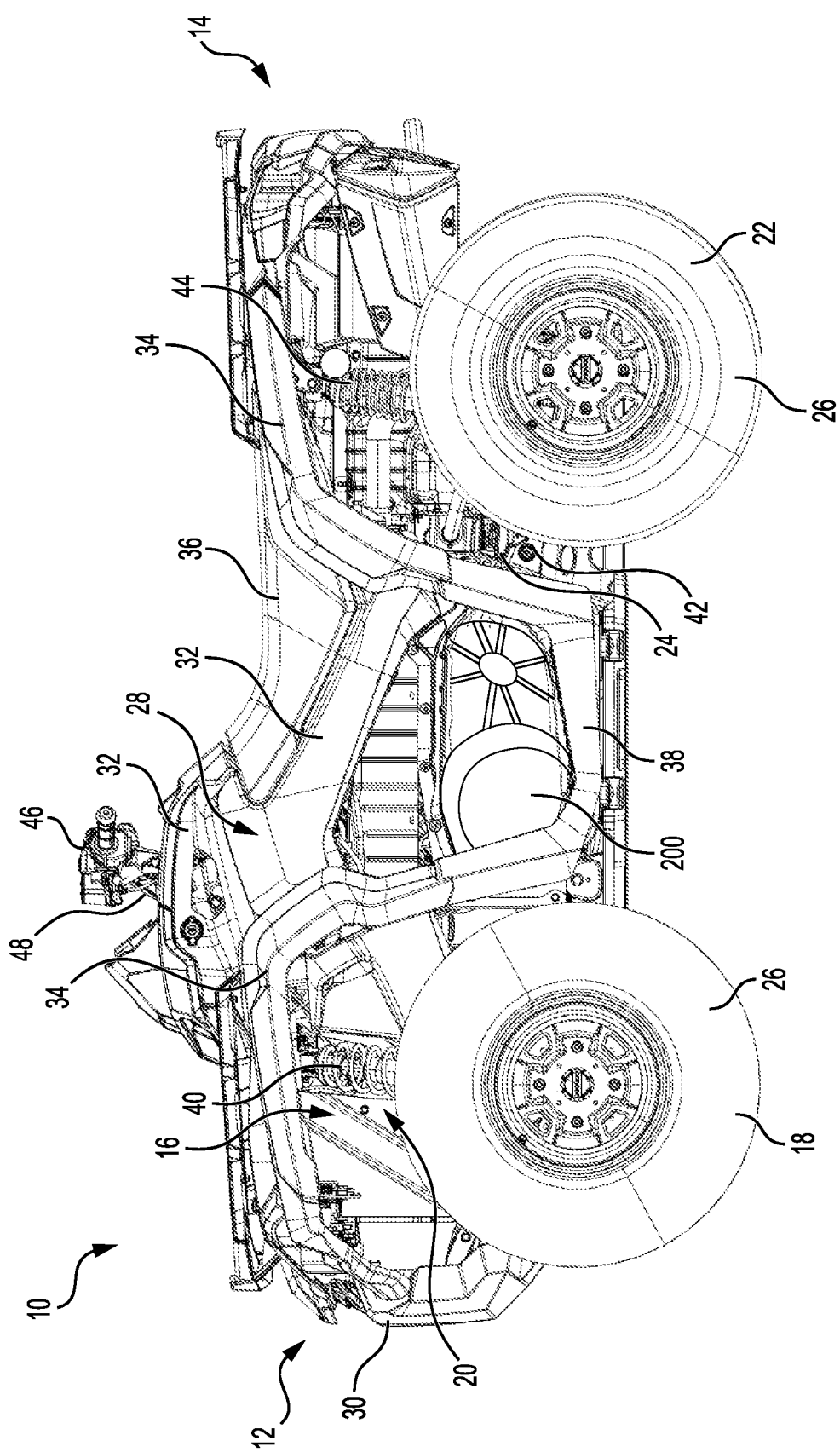
FIG. 1 is a left side elevation view of an all-terrain vehicle (ATV)

With reference to FIG. 1, the ATV 10 has a front end 12 and a rear end 14 defined consistently with a forward travel direction of the ATV 10. The ATV 10 has a frame 16 to which a vehicle body is mounted. A pair of front ground-engaging wheels 18 is suspended from a front portion of the frame 16 via front suspension assemblies 20. A pair of rear ground-engaging wheels 22 is suspended from a rear portion of the frame 16 via rear suspension assemblies 24. The front and rear wheels 18, 22 are provided with tires 26 adapted for off-road conditions and traversing rugged terrain. Other types ground-engaging members are also contemplated. For instance, in some embodiments, the front and rear wheels 18, 22 could be replaced by front and rear track assemblies including endless drive tracks.

As shown in FIG. 1, the ATV 10 also includes fairings 28 including a front fascia 30 at the front end 12 of the ATV 10 and several side panels 32 extending over lateral sides of the ATV 10. A fender 34 is disposed over each wheel well overarching the wheels 18, 22 to protect the driver and/or passenger from dirt, water and other debris being projected by the wheels 18, 22. The ATV 10 also has a straddle seat 36 mounted to and supported by the frame 16 for accommodating a driver of the ATV 10. Driver footrests 38 are provided on either side of the driver seat 28 and are disposed vertically lower than the driver seat 36 to support the driver's feet. Another straddle seat may be provided behind the straddle seat 36 to accommodate a passenger.

In this embodiment, each front suspension assembly 20 includes an upper A-arm (not shown), a lower A-arm (not shown) and a front shock absorber assembly 40. In this embodiment, each rear suspension assemblies 24 includes a swing arm 42 and a rear shock absorber assembly 44. Other types of front and rear suspension assemblies 20, 24 are contemplated.

A steering assembly, including a handlebar 46, is rotationally supported by the frame 12 to enable a driver to steer the ATV 10. The handlebar 46 connected to a steering column 48 for actuating steering linkages (not shown) operatively connected to the left and right front wheels 18. In this embodiment, the steering assembly includes a power steering electric motor (not shown) mounted to the steering column 48 for facilitating steering.

A throttle operator (not shown) in the form of a thumb-actuated throttle lever is provided near the right end of the handlebar 46. Other types of throttle operators, such as a finger-actuated throttle lever and a twist grip, are also contemplated. The throttle operator is selectively actuated by the driver of the ATV 10 to control an internal combustion engine 100 (FIG. 2) of the ATV 10. More specifically, a throttle operator position sensor (not shown) is operatively connected to the throttle operator to sense movement thereof caused by the driver in operation. The sensed input from the throttle operator position sensor is transmitted to an electronic control unit (ECU) (not shown) which controls operation of the engine 100. The engine 100, which is mounted to the middle portion of the frame 16 below the seat 36, drives a continuously variable transmission (CVT) 200. The CVT 200 is operatively connected to the wheels 18, 22 to drive the wheels 18, 22.

Figure 2:
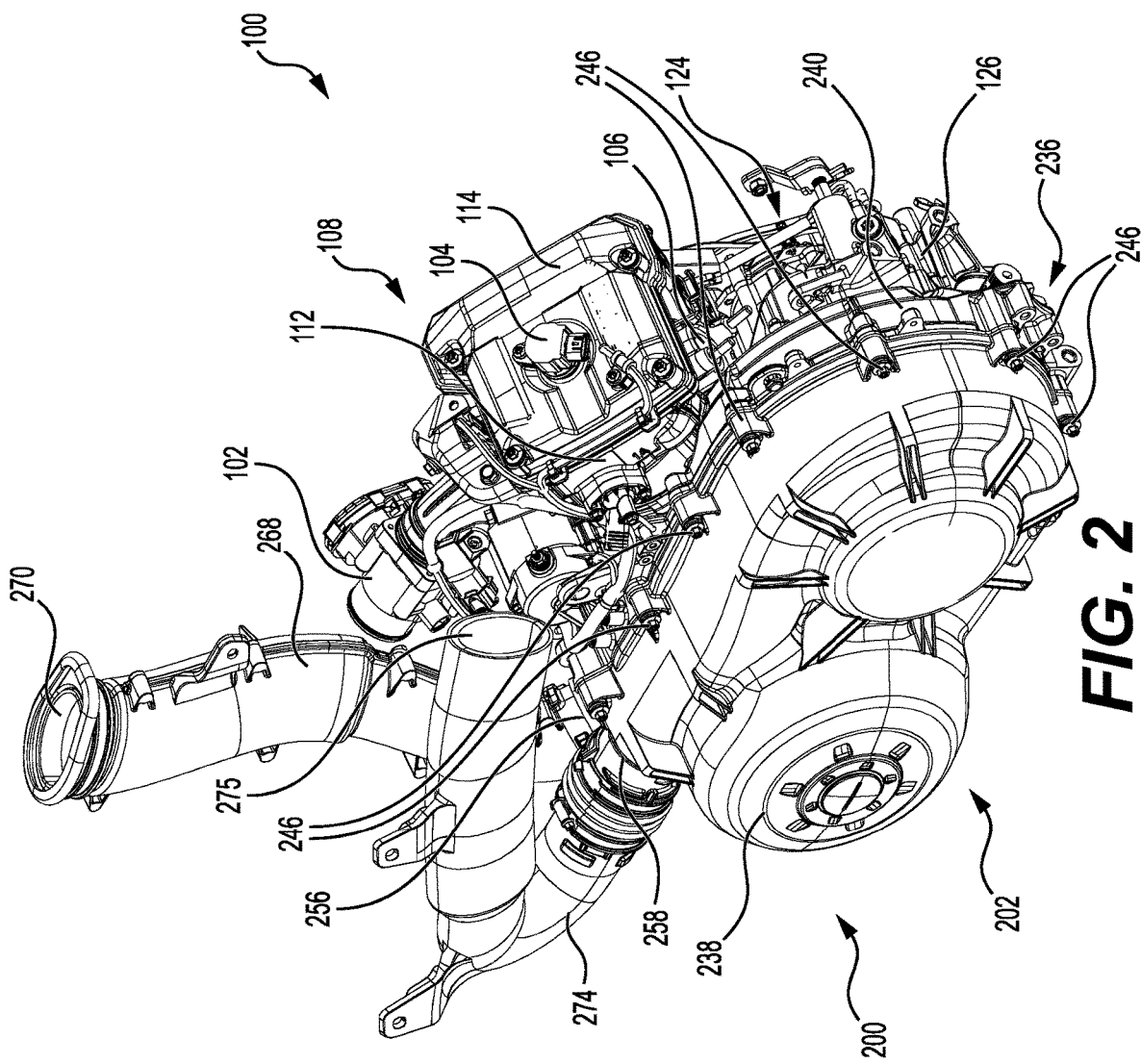
FIG. 2 is a perspective view taken from a rear, left side of an engine and continuously variable transmission (CVT) of the ATV of FIG. 1.

In the present embodiment, the engine 100 is a four-stroke engine having a single, inclined cylinder. Other types of engines are contemplated, such as two-stroke engines and/or engines having more than one cylinder. With reference to FIG. 2, the cylinder has an intake port (not shown) connected to a throttle body 102 (FIG. 2) controlling delivery of air into the engine 100. The cylinder has a fuel injector (not shown) injecting fuel into the engine 100 and a spark plug 104 igniting the fuel-air mixture to initiate the combustion cycle. The cylinder has an exhaust port 106 connected to an exhaust system (not shown) through which the exhaust gases are removed from the engine 100. These components of a four-stroke engine are well known to those of ordinary skill in the art, and as such will not be described in detail herein.

Figure 9:
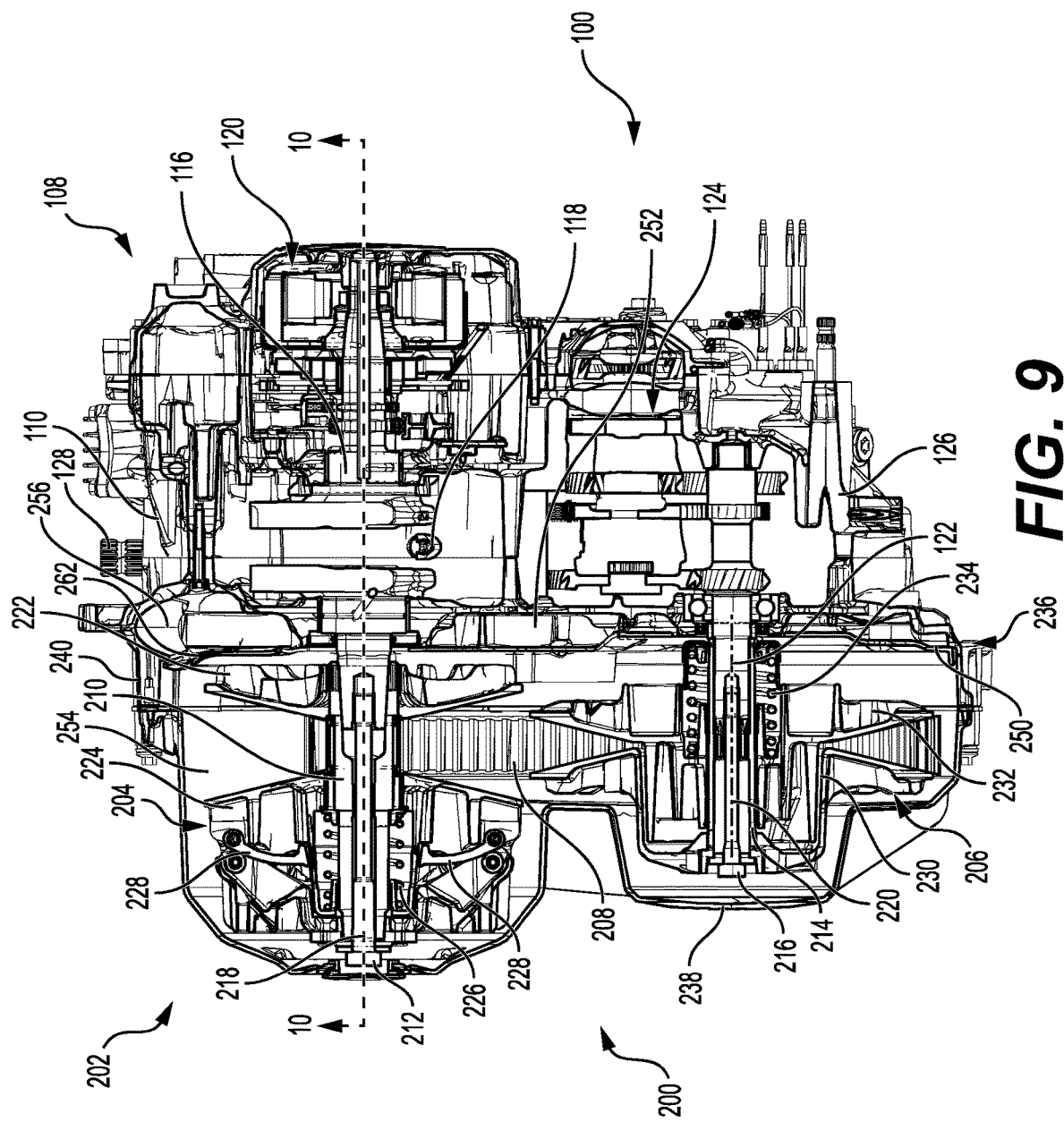
FIG. 9 is a cross-sectional view of the engine and CVT of FIG. 2 taken along a plane containing axes of rotation of the drive and driven pulleys.
Figure 10:
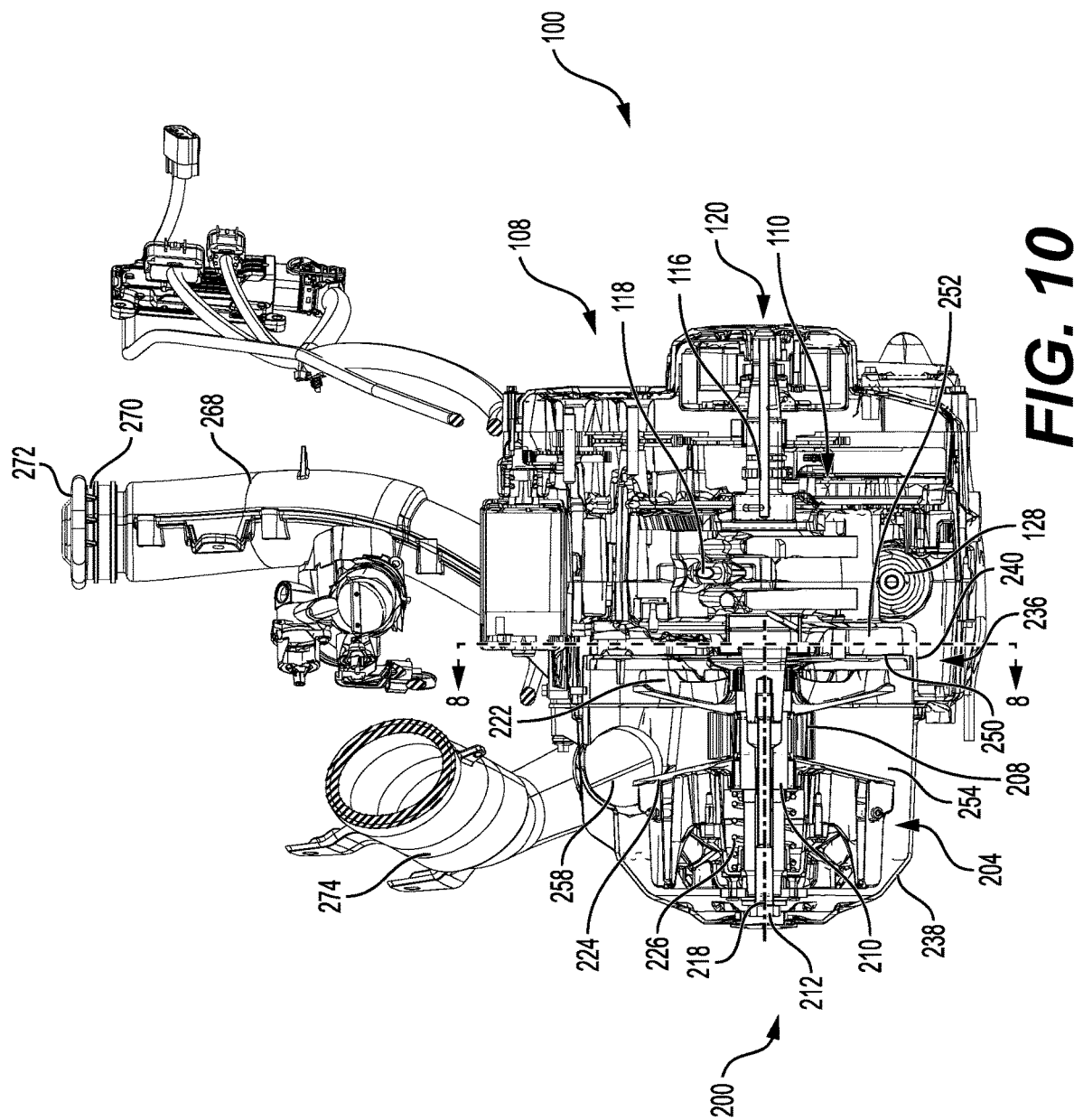
FIG. 10 is a cross-sectional view of the engine and CVT of FIG. 2 taken along a vertical plane containing line 10-10 of FIG. 9.

With reference to FIGS. 9 and 10, the engine 100 has an engine block 108. The engine block 108 has a crankcase 110 and a cylinder block 112. A cylinder head 114 is connected to a top of the cylinder block 112. A crankshaft 116 is rotationally supported in the crankcase 110. The crankshaft 116 is connected to a connecting rod 118. The connecting rod 118 connects to a piston (not shown). The piston is disposed in the cylinder defined by the cylinder block 112. A generator and flywheel assembly 120 is connected to a right end of the crankshaft 116. The left end of the crankshaft 116 is connected to and drives the CVT 200 as will be described in more detail below.

Figure 6:
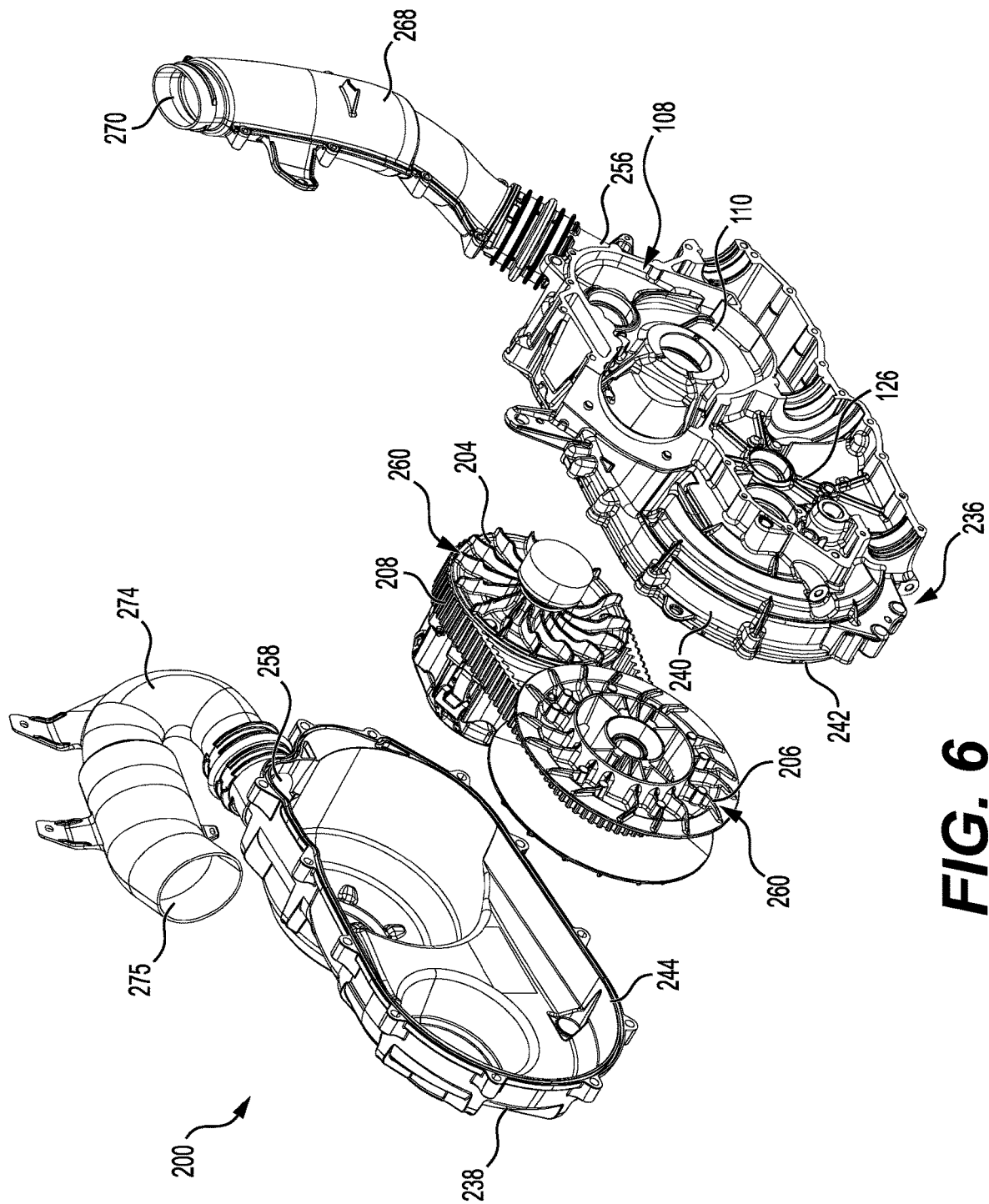
FIG. 6 is a partially exploded perspective view taken from a rear, right side of the CVT of FIG. 2.

The CVT 200 drives an output shaft 122. The output shaft 122 drives a geared transmission 124. The geared transmission 124 defines a plurality of gear configurations, sometimes referred to as "gears", that can be selected by a driver of the ATV. In one embodiment, the gears include: high gear, low gear, reverse, neutral and park. It is contemplated that the geared transmission 124 could have more or less gear or different gears. In the present embodiment, portions of a transmission housing 126 of the geared transmission 124 are integrally formed with portions of the engine block 108, as can be seen in FIG. 6 for example. The geared transmission 124 drives a plurality of shafts, including driveshaft 128 (FIGS. 9 and 10), that connect to the wheels 18, 22. In the present embodiment, the geared transmission 124 also allows to select if all four wheels 18, 22 are driven from the geared transmission 124 (i.e., four-wheel drive or 4WD) or if only the rear wheels 22 are driven from the geared transmission 124 (i.e., two-wheel drive or 2WD).

With reference to FIGS. 2 to 10, the CVT 200 will be described in more detail. The CVT 200 includes a CVT housing 202, a drive pulley 204, a driven pulley 206 and a belt 208 looped around the drive and driven pulleys 204, 206. In the present embodiment, the belt 208 is made of rubber, but other materials are contemplated.

As best seen in FIGS. 9 and 10, the drive pulley 204 is connected to a drive pulley shaft 210. The drive pulley shaft 210 is connected to the left end of the crankshaft 116 by a bolt 212. The crankshaft 116 drives the drive pulley shaft 210, which drives the drive pulley 204. It is contemplated that the drive pulley shaft 210 and the crankshaft 116 could be a single shaft. The belt 208 transfers torque between the drive pulley 204 and the driven pulley 206. As best seen in FIG. 10, the driven pulley 206 is connected to a driven pulley shaft 214. The driven pulley shaft 214 is connected to the left end of the output shaft 122 by a bolt 216. The driven pulley 206 drives the driven pulley shaft 214, which drives the output shaft 122. It is contemplated that the driven pulley shaft 214 and the output shaft 122 could be a single shaft. The drive pulley 204 rotates about an axis of rotation 218 defined by the drive pulley shaft 210. The driven pulley 206 rotates about an axis of rotation 220 define by the driven pulley shaft 214.

With reference to FIG. 9, the drive pulley 204 has a fixed sheave 222 and a movable sheave 224. A spring 226 biases the movable sheave 224 away from the fixed sheave 222. Centrifugal weights 228 push the movable sheave 224 toward the fixed sheave 222 as a speed of rotation of the drive pulley 204 increases. The driven pulley 206 has a fixed sheave 230 and a movable sheave 232. A spring 234 biases the movable sheave 232 toward the fixed sheave 230. During operation, as the movable sheave 224 of the drive pulley 204 moves toward the fixed sheave 222 of the drive pulley 204, thereby increasing the effective diameter of the drive pulley 204, the movable sheave 232 of the driven pulley 206 moves away from the fixed sheave 230, thereby decreasing the effective diameter of the driven pulley 206.

The CVT housing 202 has a right portion 236 defined by the engine 100 and the geared transmission 124 and a left portion defined by a cover 238. More specifically, and as best seen in FIG. 6, the right portion 236 is defined by a left side of the engine block 108, including a left side of the crankcase 110, and a left side of the transmission housing 126. The right portion 236 has a lip 240. A portion of the lip 240 is defined by the engine 100 and another portion of the lip 240 is defined by the geared transmission 124. More specifically, part of the lip 240 protrudes from the crankcase 110 and another part of the lip 240 protrudes from the transmission housing 126. An edge 242 of the lip 240 defines a closed contour. An edge 244 of the cover 238 also defines a closed contour having a shape corresponding to a shape of the edge 242. The cover 238 is connected to the lip 240, and therefore to the engine 100 and the geared transmission 124, by fasteners 246 (FIG. 2). When the cover 238 is fastened to the lip 240, a sealed joint is defined between the edges 244, 242 of the cover 238 and the lip 240.

The cover 238 and the right portion 236 of the CVT housing 202 (and therefore the engine and the geared transmission 124) define a volume therebetween. The drive pulley 204, the driven pulley 206 and the belt 208 are disposed in this volume. The CVT 200 also includes a baffle 250 that is disposed in the volume defined between the cover 238 and the right portion 236 of the CVT housing 202. The baffle 250 separates this volume in a right chamber 252 and a left chamber 254 as best seen in FIGS. 9 and 10. As can be seen, the right chamber 252 is disposed to the right of the baffle 250, between the baffle 250 and the engine 100 and geared transmission 124. As can also be seen, the left chamber 254 is disposed to the left of the baffle 250, between the baffle 250 and the cover 238. The drive pulley 204, the driven pulley 206 and the belt 208 are disposed in the left chamber 254. The baffle 250 is fastened to the lip 240.

Figure 3:
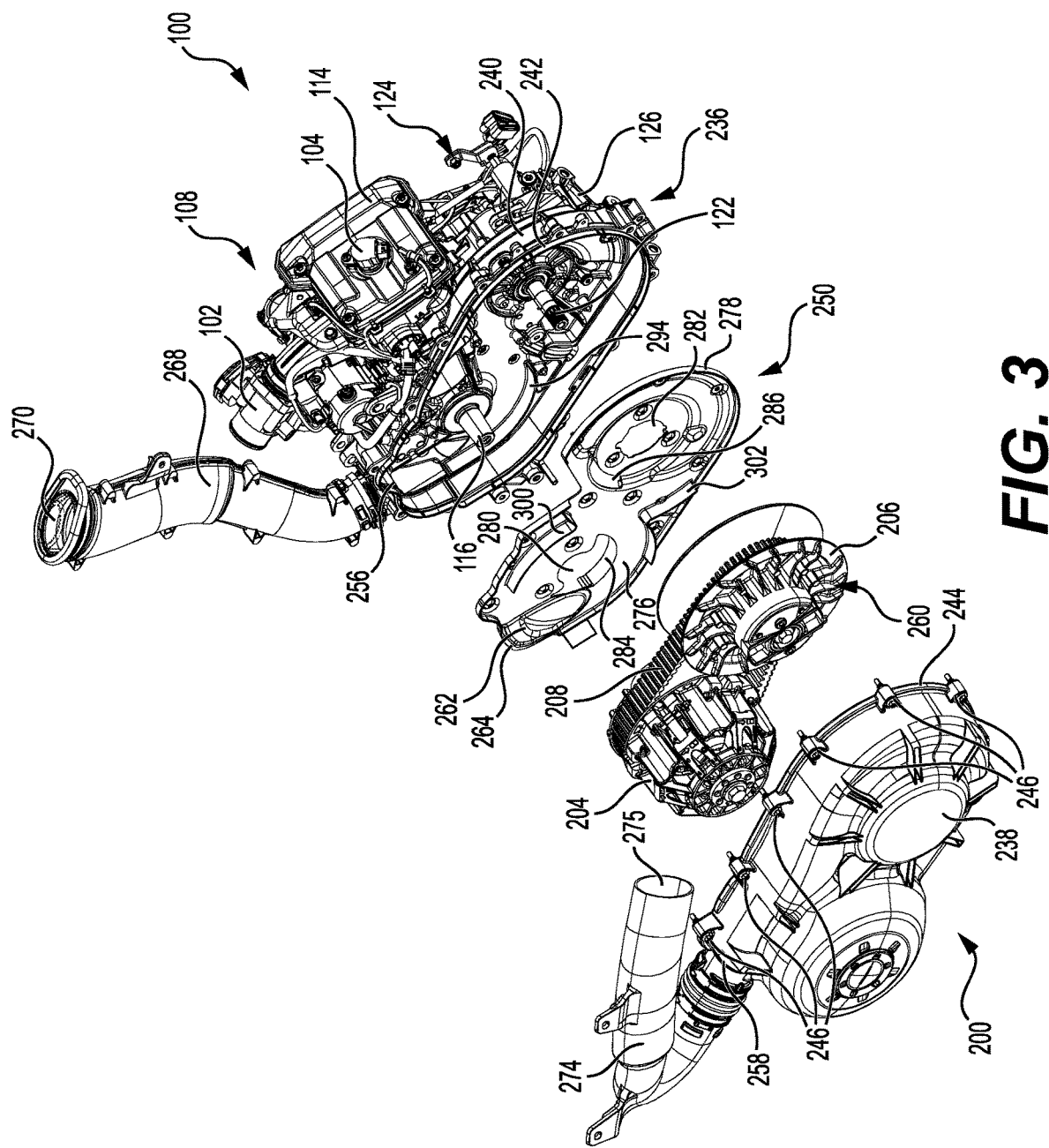
FIG. 3 is a partially exploded perspective view taken from a rear, left side of the engine and CVT of FIG. 2 showing a cover, a drive pulley, a driven pulley, a belt and a baffle of the CVT disconnected from the engine.

With reference to FIG. 3, to cool the components of the CVT 200, the CVT housing 202 defines an air inlet 256 fluidly communicating with the right chamber 252 and an air outlet 258 fluidly communicating with the left chamber 254. During operation of the engine 100, the air inlet 256 supplies air to the right chamber 252, the air in the right chamber 252 flows into the left chamber 254 through the baffle 250 as will be described in more detail below, and the air in the left chamber 254 flows out of the left chamber 254 via the air outlet 258. This flow of air cools the components of the CVT 200, including the drive pulley 204, the driven pulley 206 and the belt 208. It is contemplated that in alternative embodiments, the air inlet 256 and the air outlet 258 could be located elsewhere on the CVT housing 202. Fins 260 provided on the drive pulley 204 and the driven pulley 206 make the drive and driven pulleys 204, 206 act like fans to create the air flow from the air inlet 256 to the air outlet 258.

Figure 8:
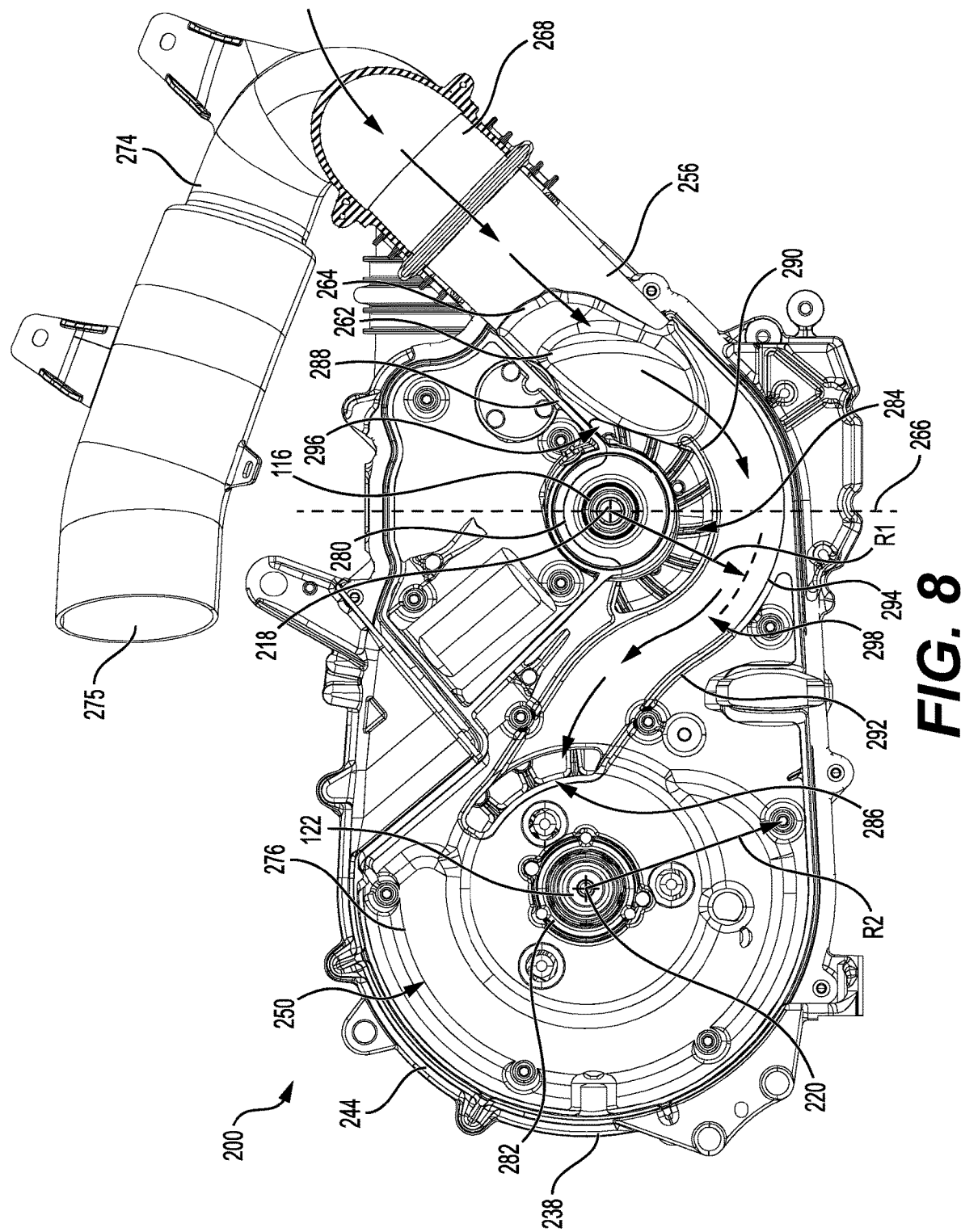
FIG. 8 is a cross-sectional view of the CVT of FIG. 2 taken along line 8-8 of FIG. 10.

The air inlet 256 is defined in a front portion the lip 240, and is therefore defined by the engine 100, as best seen in FIG. 8. The baffle 250 defines a curved recess 262 at an upper front portion thereof. The curved recess 262 has an edge 264 that is adjacent to a left portion of the air inlet 256 and which has a shape corresponding to the shape of the left portion of the air inlet 256 as can be seen in FIGS. 8 and 9. The curved recess 262 helps direct air entering the right chamber 252 via the air inlet 256. The air outlet 258 is defined in an upper front portion of the cover 238, as best seen in FIG. 10. Both the air inlet 256 and the air outlet 258 are disposed in front of a vertical plane 266 (FIG. 8)

containing the axis of rotation 218 of the drive pulley 204, and the output shaft 122 is disposed behind the vertical plane 266.

An air intake duct 268 is connected to the air inlet 256. The air intake duct 268 extends generally upwardly from the air inlet 256. An inlet 270 of the air intake duct 268 is located at a position where fresh air can be aspirated into the CVT housing 202. The inlet 270 is covered by cap 272 (FIG. 10) to help prevent debris from being aspirated into the CVT housing 202, but which still permits the flow of air. An air exhaust duct 274 is connected to the air outlet 258. The air exhaust duct 274 first extends generally forward from the air outlet 258, then extends generally rearward to an outlet 275. The outlet 275 is positioned so as to help prevent the hot air being exhausted by the air exhaust duct 274 from being aspirated back into the CVT housing 202 or from being aspirated into the engine 100.

Figure 4:
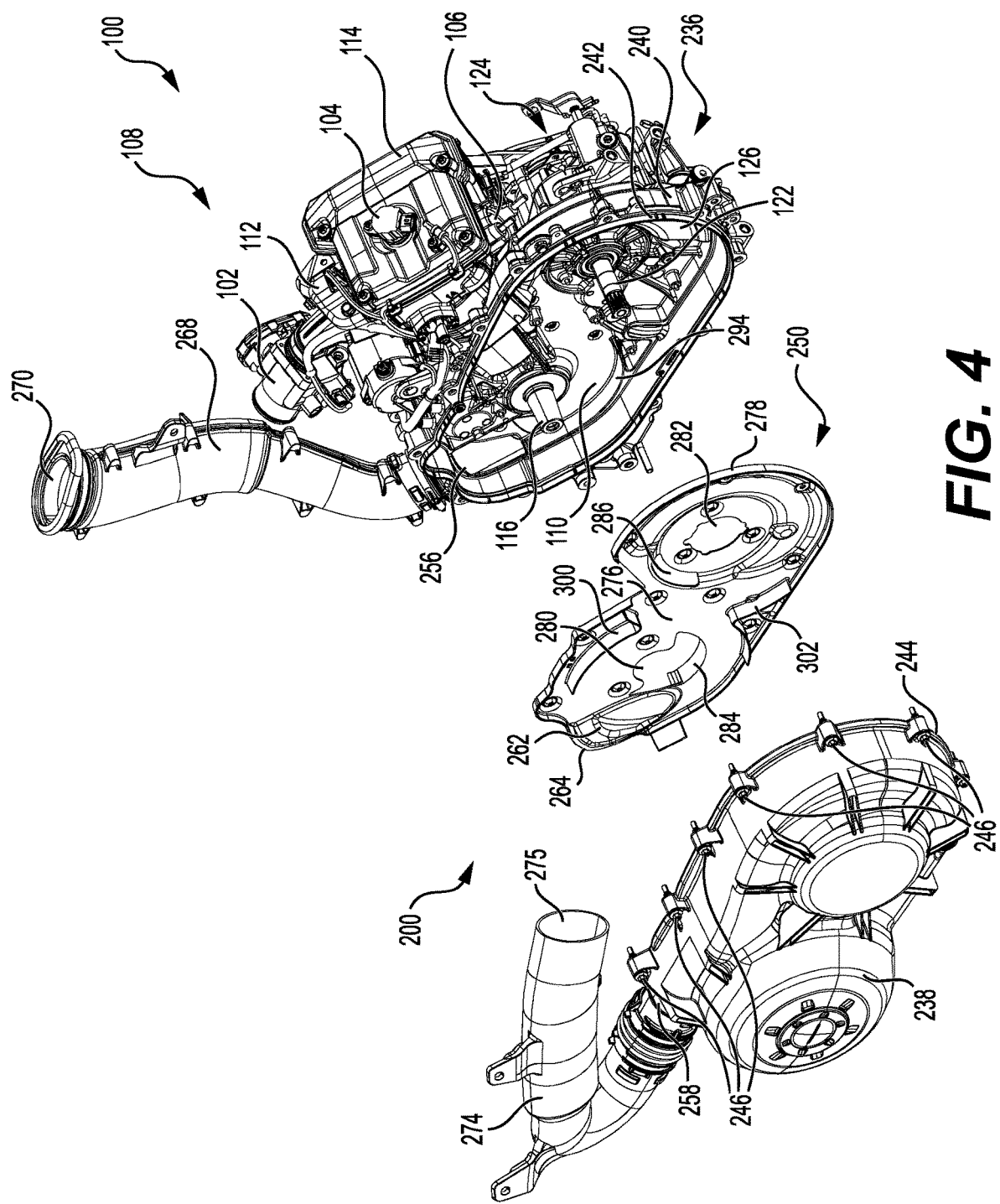
FIG. 4 is a partially exploded perspective view taken from a rear, left side of the engine and CVT of FIG. 2 showing the cover and the baffle of the CVT disconnected from the engine, with the drive pulley, the driven pulley, and the belt being omitted.
Figure 5:
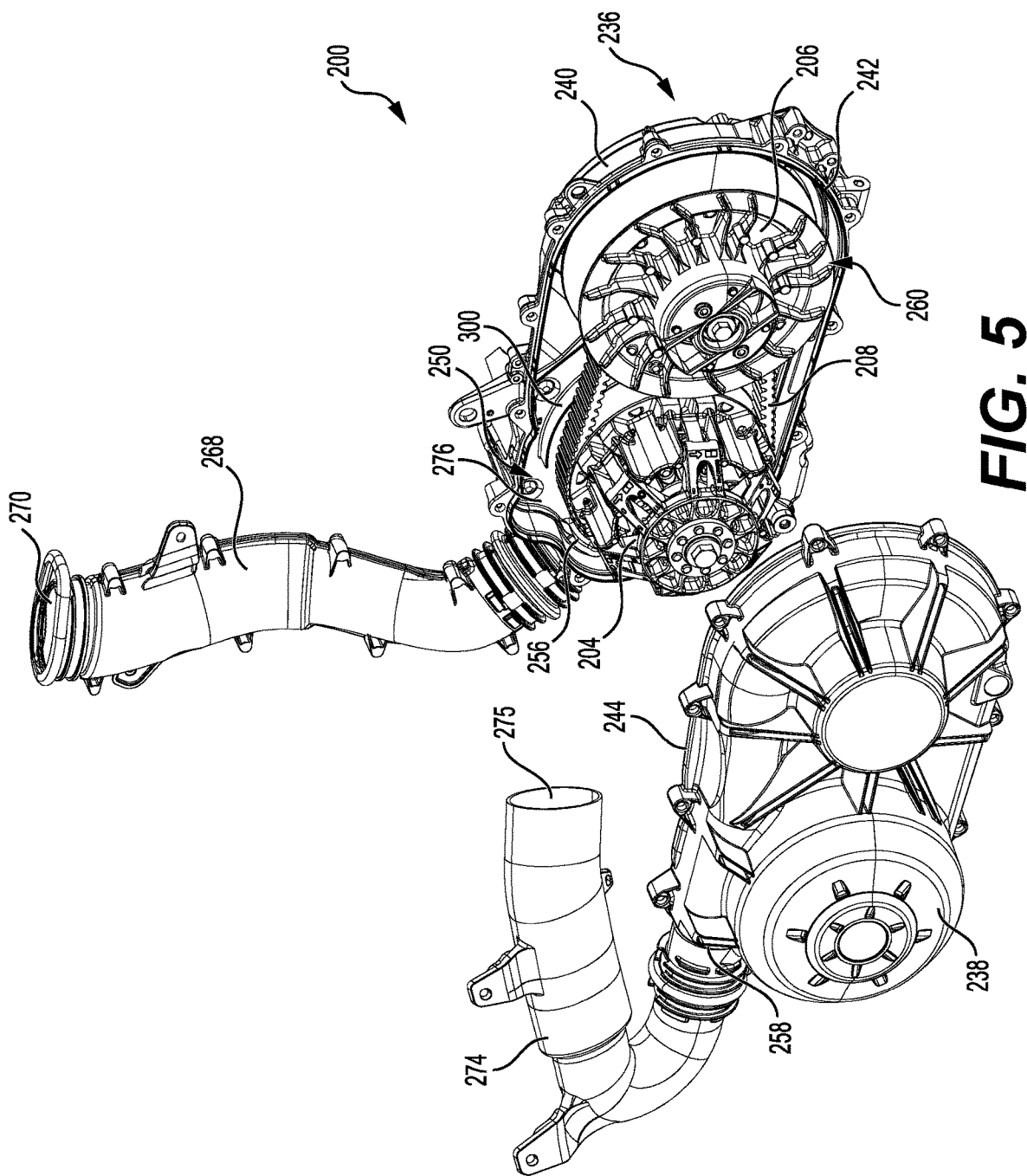
FIG. 5 is a partially exploded perspective view taken from a rear, left side of the CVT of FIG. 2.
Figure 7:
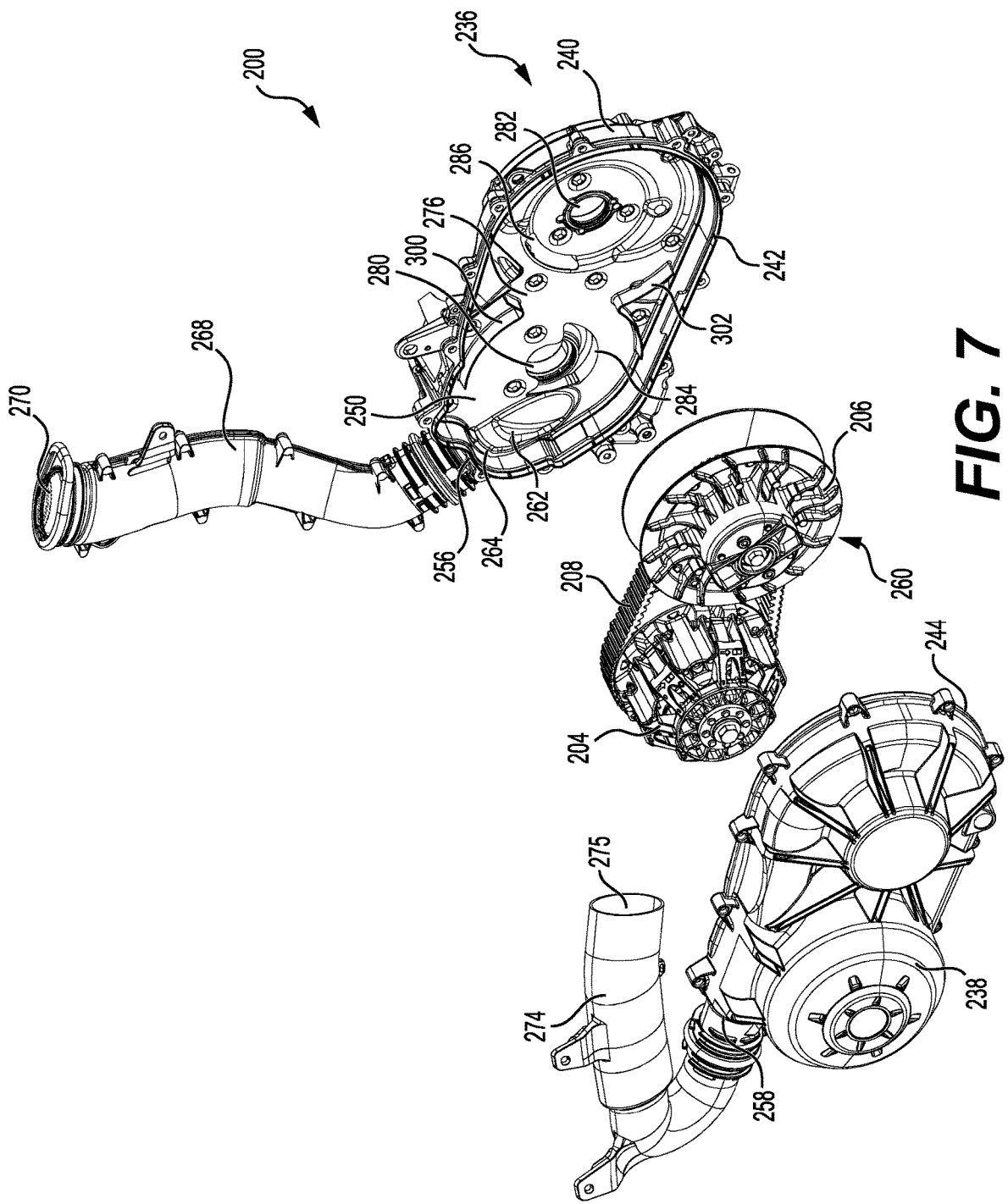
FIG. 7 is another partially exploded perspective view taken from a rear, left side of the CVT of FIG. 2.

Turning now to FIGS. 4, 7 and 8, the baffle 250 will be described in more detail. The baffle 250 has a vertical wall 276 and a lip 278 extending along a majority of the contour of the wall 276. The recess 264 described above is defined in the wall 276. The vertical wall 276 defines an aperture 280 through which the crankshaft 116 extends. The vertical wall 276 also defines an aperture 282 through which the output shaft 122 extends. The vertical wall 276 also defines apertures 284, 286 that fluidly communicate the right chamber 252 with the left chamber 254. During operation of the engine 100, the air in the right chamber 252 flows into the left chamber 254 via the aperture 284, 286.

The aperture 284 is disposed at a distance from the axis of rotation 218 of the drive pulley 204 that is less than a drive pulley radius R1 (FIG. 8) of the drive pulley 204. As such, the aperture 284 is aligned with the drive pulley 204. It is contemplated that only a portion of the aperture 284 could be disposed at a distance from the axis of rotation 218 of the drive pulley 204 that is less than the drive pulley radius R1 such that the aperture 284 is only partially aligned with the drive pulley 204. Most of the aperture 284 is disposed vertically lower than the axis of rotation 218 of the drive pulley 204. The aperture 284 extends horizontally in front of and behind the axis of rotation 218 of the drive pulley 204. It is contemplated that the aperture 284 could be positioned elsewhere about the axis of rotation 218 of the drive pulley 204. The aperture 284 generally has the shape of an annular segment, but other shapes are contemplated. In the present embodiment, the aperture 284 is fused with the aperture 280 so as to form a larger aperture. It should be understood that the aperture 280 corresponds to the portion of this larger aperture through which the crankshaft 116 extends and that the aperture 284 corresponds to the portion of this larger aperture through which air can flow from the right chamber 252 to the left chamber 254. It is contemplated that the apertures 280, 284 could be completely separate from each other.

The aperture 286 is disposed at a distance from the axis of rotation 220 of the driven pulley 206 that is less than a driven pulley radius R2 (FIG. 8) of the driven pulley 206. As such, the aperture 286 is aligned with the driven pulley 206. It is contemplated that only a portion of the aperture 286 could be disposed at a distance from the axis of rotation 220 of the driven pulley 206 that is less than the driven pulley radius R2 such that the aperture 286 is only partially aligned with the driven pulley 206. Most of the aperture 286 is disposed vertically higher than the axis of rotation 220 of the driven pulley 206. The aperture 286 is disposed in front of the axis of rotation 220 of the driven pulley 206, longitudinally between the axis of rotation 218 of the drive pulley 204 and the axis of rotation 220 of the driven pulley. It is contemplated that the aperture 286 could only be partially in front of the axis of rotation 220 of the driven pulley 206. It is contemplated that the aperture 286 could be positioned elsewhere about the axis of rotation 220 of the driven pulley 206. The aperture 286 generally has the shape of an annular segment, but other shapes are contemplated. In the present embodiment, the aperture 286 is completely separate from the aperture 282 through which the output shaft 122 extends. It is contemplated that the apertures 286 could be fused with the aperture 282.

The wall 276 of the baffle 250 has walls 288, 290, 292 (FIG. 8) that extend rightward therefrom toward the engine 100. The engine 100 has a wall 294 (best seen in FIG. 4) that extends leftward toward the baffle 250. The walls 288, 290 define a passage 296 in the right chamber 252 that directs air from the air inlet 256 toward the aperture 284. The walls 290, 292 and 294 define a passage 298 in the right chamber 252 that directs air from the air inlet 256 toward the aperture 286. As can be seen, the passage 256 passes under the aperture 284.

As such, during operation of the engine 100, part of the air entering the right chamber 252 via the air inlet 256 flows into the left chamber 254 via the aperture 284 and part of the air entering the right chamber 252 via the air inlet 256 flows into the left chamber 254 via the aperture 286, as indicated by arrows in FIG. 8. The faster the drive pulley 204 rotates, the more air will flow through the aperture 284. Similarly, the faster the driven pulley 206 rotates, the more air will flow through the aperture 286.

To help assist directing the flow of air in the left chamber 254, the wall 276 of the baffle 250 has walls 300, 302 that extends leftward therefrom toward the cover 238.

It is contemplated that in alternative embodiments, the CVT 200 could be disposed on a right side of the engine 100. It is also contemplated that in other alternative embodiments, the engine 100 could be oriented such that the crankshaft 116 extends longitudinally, with the CVT 200 being disposed in front of or behind the engine 100, or that the engine 100 could be oriented such that the crankshaft 116 extends vertically, with the CVT 200 being disposed in above or below the engine 100.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   an engine comprising:
      a crankcase; and
      a crankshaft rotationally supported by the crankcase;
   a drive pulley connected to and driven by the crankshaft;
   a driven pulley;
   an output shaft connected to and driven by the driven pulley;
   a belt looped around the drive pulley and the driven pulley for transferring torque between the drive pulley and the driven pulley;
   a cover connected to the engine, the cover and the engine defining a volume therebetween, the drive pulley and the driven pulley being disposed in the volume;
   a baffle disposed in the volume, the baffle separating the volume in a first chamber and a second chamber, the first chamber being disposed between the baffle and the engine, the second chamber being disposed between the baffle and the cover,
the drive pulley and the driven pulley being disposed in the second chamber,
the baffle defining first and second apertures fluidly communicating the first chamber with the second chamber;
an air inlet fluidly connected to the first chamber; and
an air outlet fluidly connected to the second chamber,
during operation of the engine, the air inlet supplies air to the first chamber, air in the first chamber flows into the second chamber via the first and second apertures, and air in the second chamber flows out of the second chamber via the air outlet.

2. The vehicle of claim 1, wherein the air outlet is defined by the cover.

3. The vehicle of claim 1, wherein the air inlet is defined by the engine.

4. The vehicle of claim 1, wherein the air inlet and the air outlet are disposed on a same side of a vertical plane containing an axis of rotation of the drive pulley.

5. The vehicle of claim 4, wherein the air inlet and the air outlet are disposed on a first side of the vertical plane and the output shaft is disposed on a second side of the vertical plane.

6. The vehicle of claim 1, further comprising an air intake duct connected to the air inlet and an air exhaust duct connected to the air outlet.

7. The vehicle of claim 1, wherein the first aperture is at least partially aligned with the drive pulley and the second aperture is at least partially aligned with the driven pulley.

8. The vehicle of claim 1, wherein:
the drive pulley has a drive pulley radius;
at least a portion of the first aperture is at a first distance from an axis of rotation of the drive pulley that is less than the drive pulley radius;
the driven pulley has a driven pulley radius; and
at least a portion of the second aperture is at a second distance from an axis of rotation of the driven pulley that is less than the driven pulley radius.

9. The vehicle of claim 8, wherein the first aperture is at least partially vertically lower than the axis of rotation of the drive pulley.

10. The vehicle of claim 8, wherein the first aperture extends horizontally at least partially on both sides of the axis of rotation of the drive pulley.

11. The vehicle of claim 8, wherein the first aperture has a shape of an annular segment.

12. The vehicle of claim 8, wherein:
the crankshaft extends through the baffle via a third aperture defined in the baffle; and
the first and third apertures are joined.

13. The vehicle of claim 12, wherein:
the output shaft extends through the baffle via a fourth aperture defined in the baffle; and
the second and fourth apertures are completely separate from each other.

14. The vehicle of claim 8, wherein the second aperture is at least partially vertically higher than the axis of rotation of the driven pulley.

15. The vehicle of claim 8, wherein the second aperture is at least partially between the axes of rotation of the drive and driven pulleys.

16. The vehicle of claim 8, wherein the second aperture has a shape of an annular segment.

17. The vehicle of claim 1, wherein:
the engine defines at least a portion of a lip; and
the cover is connected to the lip.

18. The vehicle of claim 17, wherein at least part of the lip protrudes from the crankcase.

19. The vehicle of claim 17, wherein:
an edge of the cover defines a closed contour;
an edge of the lip defines a closed contour; and
a joint defined between the edges of the cover and the lip is sealed.

20. The vehicle of claim 1, wherein:
the baffle has at least one wall extending toward the engine,
the at least one wall defining a passage for directing air from the air inlet to the second aperture.

21. The vehicle of claim 20, wherein the passage passes under the first aperture.

22. The vehicle of claim 1, wherein:
the baffle defines a curved recess;
the curved recess has an edge adjacent to a portion of the air inlet; and
the edge of the curved recess has a shape corresponding to a shape of the portion of the air inlet.

23. The vehicle of claim 1, wherein:
the crankshaft extends through the baffle via a third aperture defined in the baffle; and
the output shaft extends through the baffle via a fourth aperture defined in the baffle.

* * * * *